United States Patent
Clay et al.

(10) Patent No.: US 6,840,434 B2
(45) Date of Patent: Jan. 11, 2005

(54) TIN-AND ZINC-BASED SOLDER FILLERS FOR ALUMINUM BODY PARTS AND METHODS OF APPLYING THE SAME

(75) Inventors: Nigel Frederick Clay, Ann Arbor, MI (US); Tsung-Yu Pan, Ypsilanti, MI (US); Alan Edward Gickler, Clinton, IA (US); Frederic Hilaire LePrevost, Jr., Clinton, IA (US)

(73) Assignees: Ford Motor Company, Dearborn, MI (US); Johnson Manufacturing Company, Princeton, IA (US)

( * ) Notice: Subject to any disclaimer, the term of this patent is extended or adjusted under 35 U.S.C. 154(b) by 0 days.

(21) Appl. No.: 10/063,300

(22) Filed: Apr. 9, 2002

(65) Prior Publication Data

US 2003/0189086 A1 Oct. 9, 2003

(51) Int. Cl.$^7$ ............................................... B23K 31/02
(52) U.S. Cl. ................. 228/223; 228/248.1; 228/180.22
(58) Field of Search ................................. 228/223, 224, 228/248.1, 180.22; 420/560

(56) References Cited

U.S. PATENT DOCUMENTS

| | | | |
|---|---|---|---|
| 900,810 A | 10/1908 | Wibrin et al. | |
| 941,835 A | 11/1909 | Wirgovits | |
| 1,332,899 A | 3/1920 | Iversen | |
| 1,417,348 A | 5/1922 | Randall | |
| 1,437,641 A | 12/1922 | Ferriere et al. | |
| 1,721,814 A | 7/1929 | Geisel | |
| 2,004,372 A | 6/1935 | Luschenowsky | |
| 2,243,278 A | 5/1941 | Johnson | |
| 2,473,886 A | 6/1949 | Hull | |
| 2,864,733 A | 12/1958 | Kranich | |
| 3,858,319 A | * 1/1975 | Stokes et al. ............... | 228/223 |
| 3,900,151 A | 8/1975 | Schoer et al. | |
| 4,070,192 A | 1/1978 | Arbib et al. | |
| 4,106,930 A | 8/1978 | Nomaki et al. | |
| 4,248,905 A | 2/1981 | Harvey | |
| 4,352,450 A | 10/1982 | Edgington | |
| 4,358,884 A | 11/1982 | Harvey et al. | |
| 4,374,904 A | 2/1983 | Harvey | |
| 4,448,748 A | 5/1984 | Radtke et al. | |
| 4,859,544 A | 8/1989 | Schwellinger | |
| 4,955,525 A | * 9/1990 | Kudo et al. ................. | 228/183 |
| 5,005,285 A | 4/1991 | Ishii | |
| 5,013,587 A | 5/1991 | Kiilunen et al. | |
| 5,094,813 A | 3/1992 | Kale | |
| 5,435,968 A | 7/1995 | Panthofer | |
| 5,806,752 A | 9/1998 | Van Evans et al. | |
| 5,863,493 A | 1/1999 | Achari et al. | |
| 5,871,690 A | 2/1999 | Achari et al. | |
| 5,961,853 A | 10/1999 | Thornton | |
| 5,985,212 A | 11/1999 | Hwang et al. | |
| 6,086,687 A | 7/2000 | Oud et al. | |
| 6,148,515 A | 11/2000 | Suzuki et al. | |
| 6,180,055 B1 | 1/2001 | Tetsuro | |
| 6,244,497 B1 | 6/2001 | Conn et al. | |

FOREIGN PATENT DOCUMENTS

| | | | |
|---|---|---|---|
| EP | 0 785 045 A1 | | 7/1997 |
| EP | 0 965 411 A1 | * | 12/1999 |
| GB | 2 289 057 A | | 8/1995 |
| JP | 51-119651 A | | 10/1976 |
| JP | 54-133449 A | | 10/1979 |
| JP | 3-35894 A | | 2/1991 |

* cited by examiner

*Primary Examiner*—Kiley S. Stoner
*Assistant Examiner*—Len Tran
(74) *Attorney, Agent, or Firm*—Brooks Kushman P.C.; Raymond L. Coppiellie

(57) ABSTRACT

One method of the present invention includes applying a paste-like fluxing agent to an aluminum body part; heating the fluxing agent to deoxidize the surface of the aluminum body part; applying a solder filler to the aluminum body part; and heating the solder filler to bond the solder filler to the aluminum body part. The melting point of the solder filler is at least 100 degrees C. lower than the melting point of the aluminum body part. Another method includes forming a filler/flux mixture; applying the filler/flux mixture; and heating the filler/flux mixture to bond the solder filler to the aluminum body part. The disclosed solder fillers include tin-based alloys as follows: (1) 12–22% copper, 3–5% zinc and 75–85% tin; and (2) 3–5% copper, iron, cobalt, or nickel, 12–40% zinc and 55–85% tin and zinc-based solder filler alloys composed of 78–98% zinc and 2–22% aluminum.

13 Claims, No Drawings

TIN-AND ZINC-BASED SOLDER FILLERS FOR ALUMINUM BODY PARTS AND METHODS OF APPLYING THE SAME

BACKGROUND OF INVENTION

1. Field of the Invention

The present invention relates to solder fillers for aluminum body parts and methods of applying solder fillers to aluminum body parts.

2. Background Art

Body fillers have been widely used in the automotive industry to provide smooth and continuous surfaces by covering and concealing surface imperfections such as spot welded joints or body surface flaws. Numerous compositions have been used as body fillers for steel automotive body panels. For example, lead-containing body fillers had been heavily utilized. Environmental concerns have caused the automotive industry to move away from lead-containing fillers and focus on developing lead-free compositions.

Polymeric materials have been used as fillers. However, such materials bond mechanically to the body part surface rather than metallurgically. The mechanical bonds are much weaker than metallurgical bonds. In addition, metallic components often must be added to the polymeric materials in order to make the polymer conductive for electro-deposition coating. Additionally, the polymeric material softening temperature is typically very close to the paint baking oven temperature. As a result, during the paint drying stage, the polymeric material can melt, thus destroying the paint finish.

Body fillers have been proposed for aluminum automotive body panels, as well. Some body solders fillers, thermally-sprayed solder fillers, and MIG-welded fillers used on steel panels have been unsuccessfully applied to aluminum body parts. Many thermal sprayed and MIG welded filler compositions for steel body parts have the potential to produce stress cracks and heat distortion when used with aluminum body panels. This detrimental result occurs because the processing temperature required for the steel solder filler is too high relative to the melting point temperatures of the aluminum alloys used in aluminum body panels.

Aluminum/silicon alloys have also been applied to aluminum pillar joints using MIG welding and thermal spraying techniques. However, these application processes have the potential to produce stress cracks and heat distortion when used with aluminum body panels since the processing temperature for the aluminum/silicon alloys is relatively close to the melting point temperatures typical of aluminum body panel alloys.

It would be desirable to provide solder fillers and methods of applying the solder fillers to aluminum body parts that provide favorable thermal and mechanical properties. It would also be desirable to provide new solder fillers for aluminum body parts and application methods that provide favorable thermal and mechanical properties, including the inhibition of stress cracking and heat distortion of the aluminum body parts. These and other advantages will become more apparent to those of ordinary skill in the art upon reference to the following description.

SUMMARY OF INVENTION

The present invention is related to methods of applying tin- and zinc-based solder fillers to aluminum body parts.

One preferred method includes applying a fluxing agent in paste-like form to the aluminum body part; heating the applied fluxing agent to deoxidize the surface of the aluminum body part; applying a solder filler of the present invention to the deoxidized surface of aluminum body part; and heating the solder filler to bond the solder filler to the aluminum body part. The melting point temperature of the solder filler is at least 100 E C lower than the melting point temperature of the aluminum body part. The resulting flux residue is washed away during the cleaning process normally conducted prior to painting the aluminum body part.

In another preferred embodiment, the solder fillers of the present invention are mixed with an inactive flux component to form a filler/flux mixture. The filler/flux mixture is applied to the aluminum body panel. Upon application of heat to the filler/flux mixture, the solder filler bonds to the aluminum body panel and the flux forms a residue. The flux residue is non-corrosive and is washed away during the cleaning process undertaken before painting the aluminum panel.

The present invention also is related to tin- and zinc-based solder fillers for aluminum body panels. In a preferred embodiment, the tin-based solder filler includes 73% to 85% Sn, 3% to 5% Zn, and 12% to 22% Cu. In another preferred formulation, a tin-based solder filler includes 55% to 85% Sn, 12% to 40% Zn, and 3% to 5% Cu, Fe, Co or Ni. The tin-based solder fillers have melting point temperatures in the range of 250 to 350 E C. The zinc-based solder fillers include 78% to 98% Zn and 2% to 22% Al. The preferred zinc based solder filler has a melting point temperature in the range of 400 to 500 E C.

Unless otherwise stated, all percentages disclosed are by weight based upon the total weight of the solder filler. Since the solder fillers disclosed have melting point temperatures that are at least about 100 degrees C. lower than that of body panel aluminum alloys, the fillers inhibit stress cracking and heat distortion of the aluminum panels. However, the melting points of the disclosed solder filler compositions are high enough that the alloys remain solid in the paint processing ovens. Therefore, conventional paint processing can be used with the disclosed solder filler alloys.

These and other advantages, features and objects of the present invention will become more apparent to those of ordinary skill in the art upon reference to the following description.

DETAILED DESCRIPTION

According to the present invention, tin- or zinc-based solder filler alloys of the present invention are applied to aluminum body parts in order to conceal surface imperfections such as spot welded joints and body surface flaws, among other uses. The solder fillers of the present invention are particularly useful in creating class-A body surfaces by filling in depressions caused by dents, ditches, or other blemishes. In addition, the solder fillers disclosed can be utilized to fill in between overlapping seams.

In a first embodiment, before applying the solder filler to the aluminum body part, a fluxing agent is applied to the aluminum body part. Heat is then applied to the fluxing agent to deoxidize the surface of the aluminum body part. The solder filler is then applied to the deoxidized surface of the aluminum body part. The solder filler is usually produced in wire or rod form for application to the body part. Upon heating, the fluxing agent is rendered inert and does not interfere with the soldering process.

Preferably, a mixture of organic compounds and metallic salts is used as fluxing agents for the tin-based solder fillers. These fluxing agents usually exhibit paste-like consistencies suitable for brush, spray and syringe dispensing. Preferably, amines are used as a fluxing agent for the tin-based alloy systems. It is understood that other fluxing agents may be used with the tin-based alloy systems as long as the agents can be dispensed using a wide variety of techniques.

The preferable fluxing agents for the zinc-based alloy system is a combination of complex salts. These fluxing agents exhibit a paste-like or slurry-like consistently suitable for brush, spray and syringe dispensing. Preferably, complex organometallic salts are used as a fluxing agent for the zinc-based alloy systems. It is understood that other fluxing agents may be utilized with the zinc-based alloy systems as long as the agents can be dispensed using a wide variety of techniques.

In an alternative embodiment, the fluxing agent is mixed with one of the solder fillers of the present invention to form a filler/flux mixture. For tin-based solder fillers, a mixture of 10% of fluxing agent and 90% of tin-based solder filler is prepared for the solder filler application process. For zinc-based solder fillers, a mixture of 50% of fluxing agent and 50% of zinc-based solder filler is prepared for the solder filler application process. The fluxing agent can be mixed with powdered solder filler to form a paste. The paste can be applied to the aluminum body part through brushing, spraying, or syringe dispensing. Alternatively, the fluxing agent is injected into hollow solder filler wire. The wire or rod is applied directly to the aluminum body part or it can be shaped into a preformed disk, ring, or tape or a contour close to the filled surface for easy application. The filler/flux wire is particularly suitable for filling in ditches or other blemishes on the surface of an aluminum body part. It is understood that other mixing techniques may be utilized that are consistent with the application of a filler material to an aluminum body part.

Once the solder filler or filler/flux mixture is applied to the aluminum body part, heat is applied to bond the solder filler to the body part. Heat may be applied to the aluminum body part through the use of convective, conductive or radiant heat. A fuel gas flame or a plasma torch may be utilized for heating. Flux residue is created by heating the filler/flux mixture. This residue is non-corrosive and can be easily washed away during the normal cleaning, sanding and grinding carried out prior to painting the aluminum body part.

The final result of the final body filler application process is a smooth, continuous surface on aluminum body panels. It is understood that the application process may have to be repeated to build up the height of the solder filler in cases of deep dents or ditches.

The present invention also includes several alloy compositions that are useful as solder fillers for aluminum body parts. Two types of tin-based solder filler alloys are disclosed. A first preferred tin-based alloy includes 12% to 22% copper, 3% to 5% zinc, and 73% to 85% tin. More preferably, the first preferred tin-based alloy consists of 20% copper, 3% zinc, and 77% tin. A second preferred tin-based solder filler alloy includes 3% to 5% copper, iron, cobalt or nickel, 12% to 40% zinc and 55% to 85% tin. More preferably, the second preferred tin-based alloy consists of 3.5% nickel, 30% zinc, and 66.5% tin. The tin-based alloy compositions contain other trace elements in order to provide a suitable viscosity for a solder filling material. Additionally, a zinc-based solder filler alloy is disclosed including a preferred composition of 78% to 98% zinc and 2% to 22% aluminum. More preferably, the zinc-based alloy consists of 80% zinc and 20% aluminum is utilized. In addition to use with aluminum body panels, the zinc-based alloys are also suitable as solder fillers for steel body parts.

The alloy compositions of this invention exhibit many desirable properties. These properties are linked principally to the physical properties of the alloys. The tin-based solder filler alloys preferably have melting point temperatures ranging from 250 to 350 E C and the zinc-based alloys preferably have melting point temperatures ranging from 400 to 500 E C. The melting point temperatures of the disclosed alloy compositions are preferably at least 100 E C lower than that of typical body panel aluminum alloys. The melting point temperatures for automobile body panel made of aluminum alloys typically range from 620 to 660 E C. Consequently, the application of the disclosed compositions inhibits stress cracking and heat distortion of the aluminum body parts. However, the melting points of the disclosed alloy compositions are high enough that the alloys remain solid in paint processing ovens. Additionally, the metallic nature of the disclosed alloys provide a solder exhibiting favorable thermal and electrical conductivity and satisfactory mechanical properties for electronic coating processes. Moreover, the zinc-based alloys will not galvanize with aluminum body parts.

While the best mode for carrying out the invention has been described in detail, those familiar with the art to which this invention relates will recognize various alternative designs and embodiments for practicing the invention as defined by the following claims.

While the present invention has been described in detail in connection with preferred embodiments, it is understood that these embodiments are merely exemplary and the invention is not restricted thereto. It will be recognized by those skilled in the art that other variations and modifications can be easily made within the scope of this invention which is defined by the appended claims.

What is claimed is:

1. A method of applying a solder filler to an aluminum body part, said method comprising the steps of:

applying a fluxing agent in paste-like form to the aluminum body part;

heating the applied fluxing agent to deoxidize the surface of the aluminum body part;

applying a tin-based solder filler to the deoxidized surface of the aluminum body part, the melting point temperature of the solder filler being at least 100 degrees C. lower than the melting point temperature of the aluminum body part and the tin-based solder filler consists of, by weight, of 81% to 85% Sn, 3% to 5% Zn, and 12% to 14% Cu; and heating the solder filler to bond the solder filler to the aluminum body part.

2. The method of claim 1 further comprises washing the aluminum body part to remove flux residue created during the heating step.

3. The method of claim 1 wherein the fluxing agent is comprised of a combination of organic compounds and metallic salts.

4. The method of claim 1 wherein the fluxing agent is comprised of a combination of complex organometallic salts.

5. A method of applying a solder filler to an aluminum body part comprising the steps of:

forming a filler/flux mixture comprising a tin-based solder filler for aluminum body parts and a fluxing agent wherein the melting point temperature of the solder filler is at least 100 degrees C. lower than the melting point temperature of the aluminum body part and the tin-based solder filler consists of, by weight, of 81% to 85% Sn, 3% to 5% Zn, and 12% to 14% Cu;

applying the filler/flux mixture to the aluminum body part; and heating the filler/flux mixture to bond the solder filler to the aluminum body part.

6. The method of claim 5 wherein the fluxing agent is comprised of a combination of organic compounds and metallic salts.

7. The method of claim 5 wherein the fluxing agent is comprised of a combination of complex organometallic salts.

8. The method of claim 5 wherein the filler/flux mixture is comprised of by weight about 10% of the fluxing agent and about 90% of the tin-based solder filler.

9. The method of claim 5 wherein the forming step is comprised of providing the tin-based solder filler in the form of a hollow wire and injecting the fluxing agent into the hollow wire.

10. A method of applying a solder filler to an aluminum body part, said method comprising the steps of:

applying a fluxing agent in paste-like form to the aluminum body part;

heating the applied fluxing agent to deoxidize the surface of the aluminum body part;

applying a tin-based solder filler to the deoxidized surface of the aluminum body part, the melting point temperature of the solder filler being at least 100 degrees C. lower than the melting point temperature of the aluminum body part and the tin-based solder filler consists of, by weight, of 55% to 85% Sn, 12% to 40% Zn, and 3% to 5% Ni, Fe, Cu or Co; and heating the solder filler to bond the solder filler to the aluminum body part.

11. The method of claim 10 wherein the solder filler consists of, by weight, 66.5% Sn, 30% Zn, and 3.5% Ni.

12. A method of applying a solder filler to an aluminum body part, said method comprising the steps of:

applying a fluxing agent in paste-like form to the aluminum body part;

heating the applied fluxing agent to deoxidize the surface of the aluminum body part;

applying a zinc-based solder filler to the deoxidized surface of the aluminum body part, the melting point temperature of the solder filler being at least 100 degrees C. lower than the melting point temperature of the aluminum body part and the zinc-based solder filler consists of, by weight, of 78% to 89% Zn and 11% to 22% Al; and heating the solder filler to bond the solder filler to the aluminum body part.

13. The method of claim 12 wherein the solder filler consists of, by weight, of 80% Zn and 20% Al.

* * * * *